(12) United States Patent
Park

(10) Patent No.: US 7,584,245 B2
(45) Date of Patent: Sep. 1, 2009

(54) WEB SERVICE GENERATION

(75) Inventor: Timothy Fulton Park, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 863 days.

(21) Appl. No.: 10/954,936

(22) Filed: Sep. 29, 2004

(65) Prior Publication Data

US 2006/0070024 A1   Mar. 30, 2006

(51) Int. Cl.
*G06F 15/16* (2006.01)
(52) U.S. Cl. ............... 709/203; 709/245; 709/246; 715/235; 717/168
(58) Field of Classification Search ............. 709/203, 709/245, 246; 717/168; 715/235
See application file for complete search history.

(56) References Cited

U.S. PATENT DOCUMENTS

| | | | |
|---|---|---|---|
| 6,560,633 B1 * | 5/2003 | Roberts et al. ............... 709/202 |
| 6,985,939 B2 * | 1/2006 | Fletcher et al. .............. 709/223 |
| 7,013,341 B1 * | 3/2006 | Christensen et al. ........ 709/230 |
| 7,162,509 B2 * | 1/2007 | Brown et al. ................. 709/201 |
| 7,194,543 B2 * | 3/2007 | Robertson et al. ........... 709/226 |
| 7,200,681 B1 * | 4/2007 | Lewin et al. ................. 709/246 |
| 7,222,121 B2 * | 5/2007 | Casati et al. ................. 707/100 |
| 7,284,039 B2 * | 10/2007 | Berkland et al. ............. 709/219 |
| 7,284,054 B2 * | 10/2007 | Radhakrishnan ............ 709/226 |
| 7,418,501 B2 * | 8/2008 | Davis et al. .................. 709/225 |
| 2004/0133656 A1 * | 7/2004 | Butterworth et al. ........ 709/219 |
| 2004/0181537 A1 * | 9/2004 | Chawla et al. ............... 707/100 |
| 2006/0031441 A1 * | 2/2006 | Davis et al. .................. 709/223 |

* cited by examiner

*Primary Examiner*—Michael Won
(74) *Attorney, Agent, or Firm*—Vierra Magen Marcus & DeNiro LLP

(57) ABSTRACT

Web service generation is described, including introspecting an original web service, importing a definition associated with the original web service from an address, and building the web service using the definition and a template associated with the definition. A web service wrapping tool is also described, including an interpreter configured to introspect a first web service to retrieve a definition from an address, a generator configured to generate a class for the web service using the definition and a template, and a builder configured to build a second web service using the class generated by the generator. Also described is a system for generating a web service, including a template defining the web service, an interpreter configured to receive and interpret an address to determine a definition associated with the web service, and a generator configured to generate the web service using the definition and the template.

17 Claims, 6 Drawing Sheets

US 7,584,245 B2

WEB SERVICE GENERATION

FIELD OF THE INVENTION

The present invention relates generally to software. More specifically, web service generation is described.

BACKGROUND OF THE INVENTION

Complex software systems are often implemented using applications and platforms from a variety of vendors. In many cases, applications may be shared among various locations, hosts, machines, clients, and other system resources using web services. Web services generally rely upon the use of common protocols or formats such as Web Services Description Language ("WSDL") to enable applications to be used between disparate platforms from multiple vendors. Platforms may include operating systems, software systems, or other foundation layer software that enables the sharing of data among various applications using formats such as XML. However, there are problems when implementing web services and ensuring a common web service may be integrated for use with different platforms.

Web services are built using common protocols (e.g., WSDL) and often requires significant developer time and labor. Integrating web services to function with different platforms often requires substantial, manual access and modification of source code associated with a particular platform or web service. Adding functionality to an existing web service is also problematic in that source code access and modifications are required. The process of adding functionality to a web service or generating a web service with additional functionality requires manual modification, deletion, or addition of source code in order to build the web service.

When building a web service, a client, host, or other machine or system resource will call an existing web service to retrieve a set of definitions to "learn" how to build the web service. Before, during, and after the call, only the functionality that is defined by the web service can be used by the client. New or different functionality can not be implemented without manually modifying the underlying application source code on the web service.

Thus, what is needed is a solution for extending a web service without changing the implementation of the original web service.

BRIEF DESCRIPTION OF THE DRAWINGS

Various embodiments of the invention are disclosed in the following detailed description and the accompanying drawings.

DETAILED DESCRIPTION OF THE PREFERRED EMBODIMENTS

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a web service to enable the addition of functionality before, or after an original web service call is described. Layering functionality or software applications on software platforms developed by disparate vendors is an important and valuable objective. Through the use of a web services wrapping tool, functionality may be automatically added to existing web services without requiring manual access or modification of existing source code associated with native web services.

Figure 1:
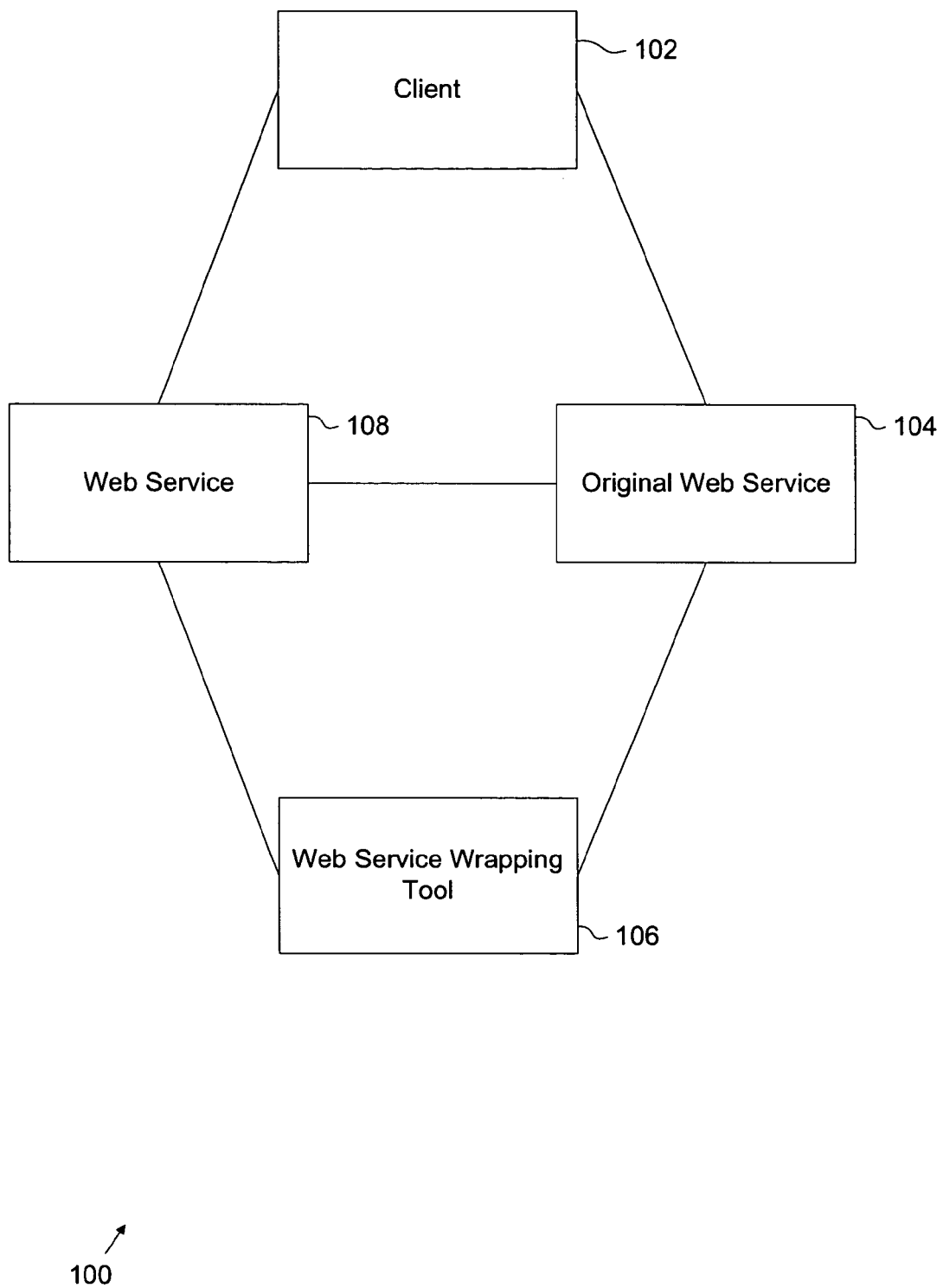
FIG. 1 illustrates an exemplary system for web service generation.

FIG. 1 illustrates an exemplary system for web service generation. Included in system 100 are client 102, original web service 104, web service wrapping tool 106, and web service 108. In other examples, more or fewer components may be included with system 100. Here, client 102 calls original web service 104, requesting a particular web service, which may be implemented as an application or program. Client 102 may also be referred to as an endpoint, which may be implemented using a computer, server, or other end user device. Web service 108 may be built by web service wrapping tool 106 and used by client 102. Web service 108 may also be referred to as a superset web service in some examples. Superset web services may include functionality provided by native or original web service 104 plus additional functionality added by web service wrapping tool 106. As an example, web service wrapping tool 106 adds or "wraps" additional or layered functionality onto original web service 104, providing metadata that enables the additional functionality to be integrated with an original web service interface. This enables a user to continue to work with a familiar user interface such as that provided by original web service 104, but with additional functionality provided by web service wrapping tool 106.

In some examples, calls may be made from client 102 to web service 108 using a web service switch (not shown), which provides for code-compatibility between client 102 and web service 108. In this example, original web service 104 may be introspected by web service wrapping tool 106 to determine a set of definitions that may be used to establish original web service 104. For example, client 102 requests to establish original web service 104, which may be a word processing, financial, document management, or other type of software-based system. Client 102 calls web service 108, which is passed to original web service 104. When a call is initiated, web service wrapping tool 106 also introspects original web service 104 to build web service 108, as described below in connection with FIGS. 4-6. In some examples, web service 108 and original web service 106 may be hosted, installed, and maintained from a single location or multiple locations. In other examples, original web service 104 may be hosted at multiple locations that are able to establish a web service with client 102. Multiple clients may also call, establish, and use web service 108. Web service wrapping tool 106 is described in further detail below in connection with FIG. 2.

Figure 2:
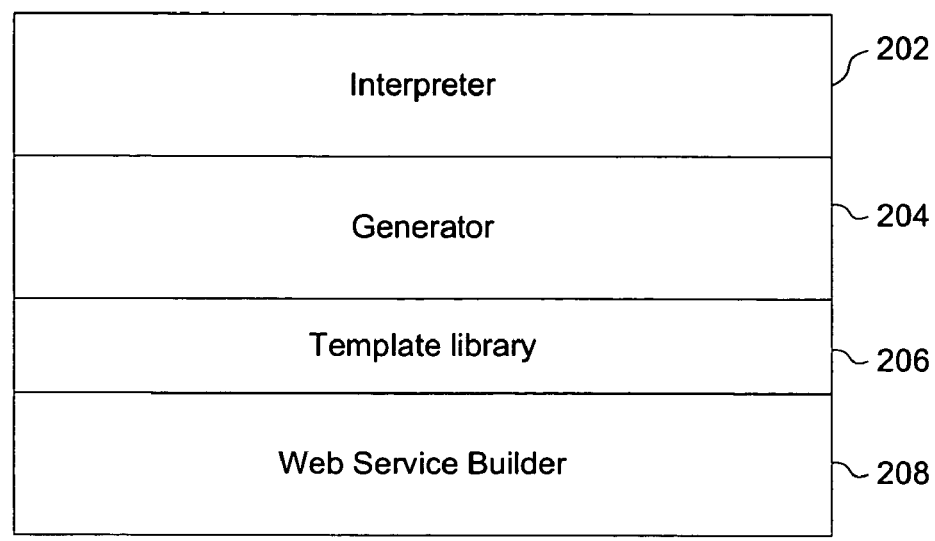
FIG. 2 illustrates an exemplary web service wrapping tool.

FIG. 2 illustrates an exemplary web service wrapping tool. Here, web service wrapping tool 106 includes interpreter 202, generator 204, template library 206, and web service builder 208. In other examples, more or fewer components may be used. In this example, web service wrapping tool 106 introspects original web service 104 when client 102 calls web service 108. Interpreter 202 introspects original web service 104 to request and receive information. As an example, information may include common formatting protocols and languages (e.g., WSDL) and a definition or set of definitions that provides details on building original web service 104. Upon receipt of definitions and other information from original web service 104 ("WSDL data"), web service wrapping tool 106 builds web service 108.

Functionality is added to web service 108 by web service wrapping tool 106 using WSDL data from original web service 104 and templates 206. As an example, generator 204 may be used to generate templates. Templates may be automatically or user-defined. Users (e.g., developers, architects, administrators, and other personnel with access to system 100 resources) may develop additional functionality to layer on native web services such as original web service 104 without accessing or modifying associated source code. Instead, web service wrapping tool enables layered functionality to be added to native web services, creating a superset of web services that are made available to client 102. Once generated, templates are stored in template library 208, from which a superset of functionality may be built and implemented into web service 108. In other examples, more or fewer components may be used to implement web service wrapping tool 106. Web service 108 is described in greater detail below in connection with FIG. 3.

Figure 3:
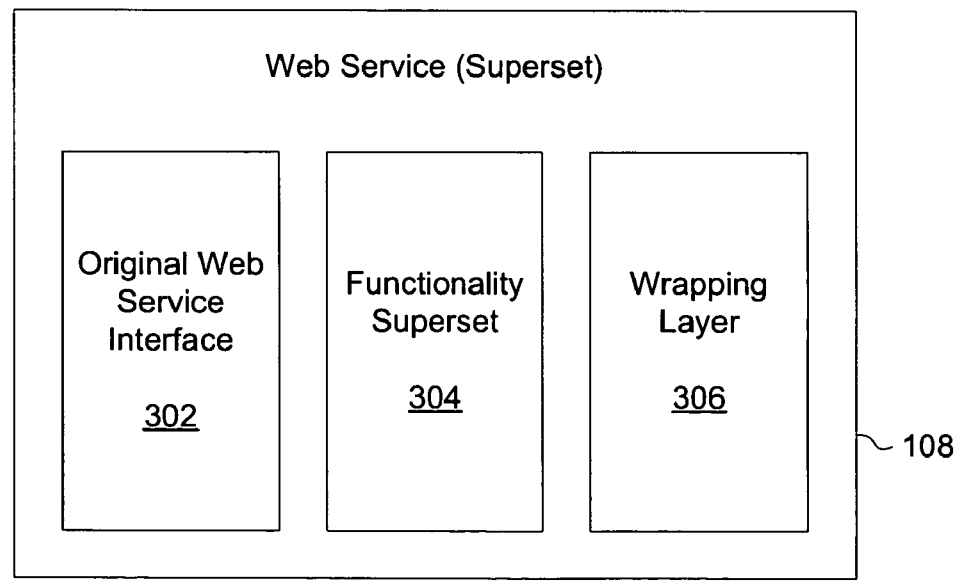
FIG. 3 illustrates an exemplary web service.

FIG. 3 illustrates an exemplary web service. As an example, web service 108 includes original web service interface 302, functionality superset 304, and wrapping layer 306. In other examples, more or fewer components may be used to implement web service 108. Here, web service 108 is built using web service wrapping tool 106. Included with web service 108 is metadata which allows an original user interface associated with original web service 104 to be used, but enables access to the superset of functionality built by web service wrapping tool 106 and templates 206. Original web service interface 302 provides, in some examples, a familiar interface to client 102 for web service 108, but layered functionality is integrated and enabled for use by web service wrapping tool 106. The superset of functionality is implemented by functionality superset 304, which is also integrated into web service 108 by wrapping layer 306. Wrapping layer 306 integrates functionality superset 304 into web service 108. In other examples, multiple wrapping layers may be used to to additional functionality in functionality superset 304 and web service 108.

Figure 4:
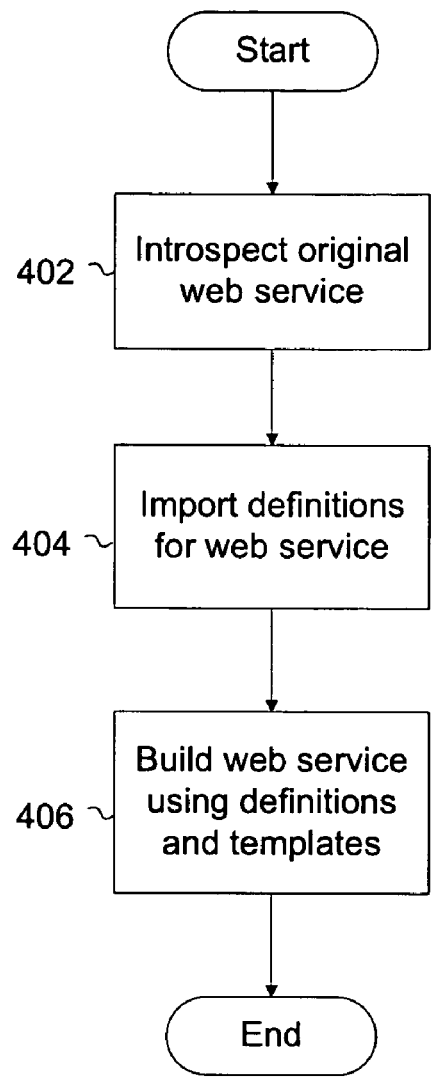
FIG. 4 illustrates an exemplary process for web service generation.

FIG. 4 illustrates an exemplary process for web service generation. As an example, web service wrapping tool 106 introspects original web service 104 (402). In this example, introspection into original web service 104 provides a set of definitions (e.g., WSDL) that enable web service wrapping tool 106 to determine what templates to use and how to generate web service 108. In other examples, a token is obtained, which enables a session call to original web service 104. Definitions indicated by original web service 104 are imported by web service wrapping tool 106 (404). Once imported, web service wrapping tool 108 builds web service 108 (406).

Figure 5:
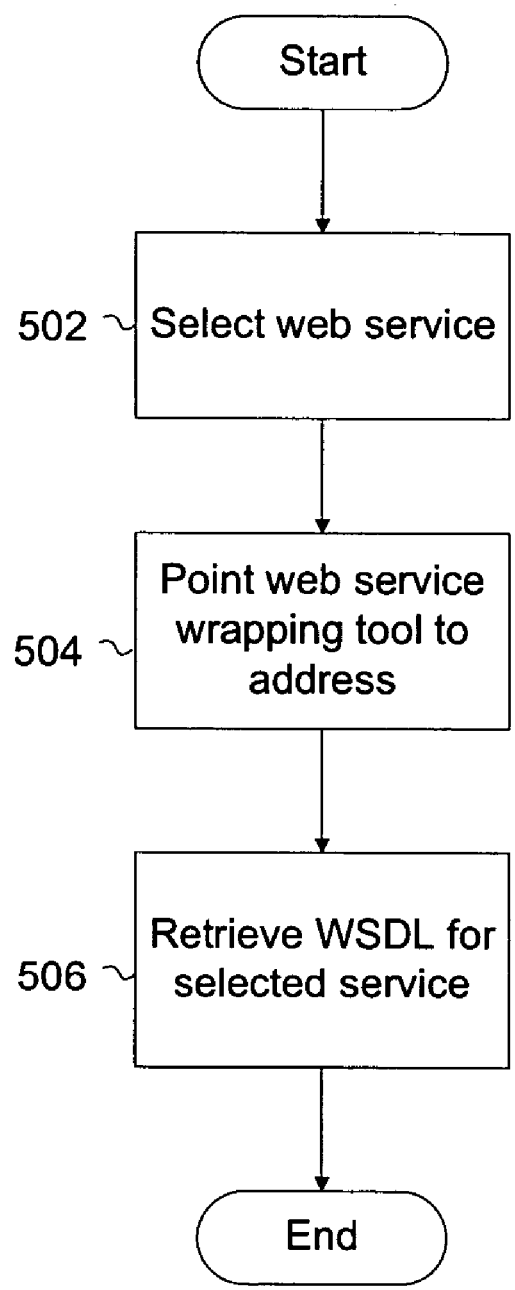
FIG. 5 illustrates an exemplary process for introspecting an original web service.

FIG. 5 illustrates an exemplary process for introspecting an original web service. Web service wrapping tool 106 selects original web service 104 (502). After selecting original web service 104, web service wrapping tool 106 points to a particular address indicated by original web service 104 (504). An address may be a name space or other location from which definitions may be imported by web service wrapping tool 106. Web service wrapping tool 106 retrieves a set of definitions for the selected service, which may be based on a common formatting language (e.g., WSDL) (506).

Figure 6:
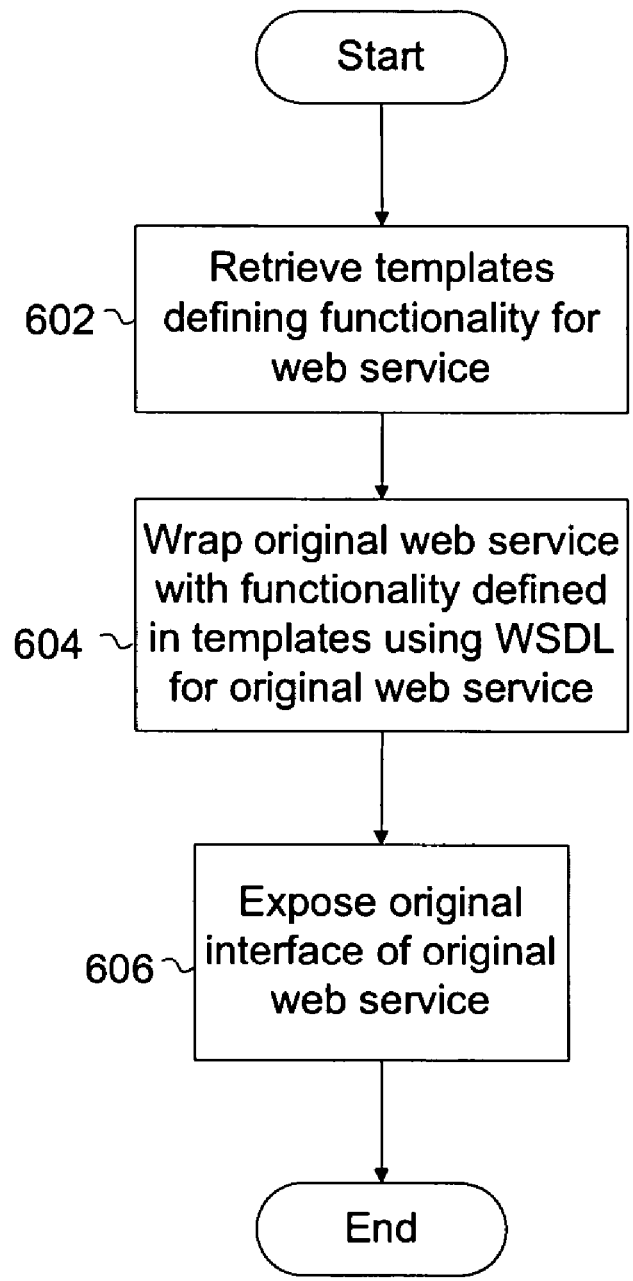
FIG. 6 illustrates an exemplary process for building a web service.

FIG. 6 illustrates an exemplary process for building a web service. Here, web service wrapping tool 106 retrieves templates stored in template library 206 (FIG. 2), which may be used to define functionality for web service 108 (602). Using templates and earlier-retrieved definitions associated with original web service 104, web service wrapping tool 106 layers additional functionality on original web service 104 (604). A user interface associated with original web service 104 is exposed to client 102 (606). In this example, the original user interface associated with web service 108 may be modified to support the additional or layered functionality added to original web service 104.

Disparate multiple vendor-developed platforms using a common web service may be modified to implement web service generation, as described above. As an example, the following module illustrates how parameters may be modified to provide for web service generation integration. In some examples, adding a pointer to a particular name space directs web service wrapping tool to namespace for retrieving definitions to build web service 108 with added functionality.

Figure 7:
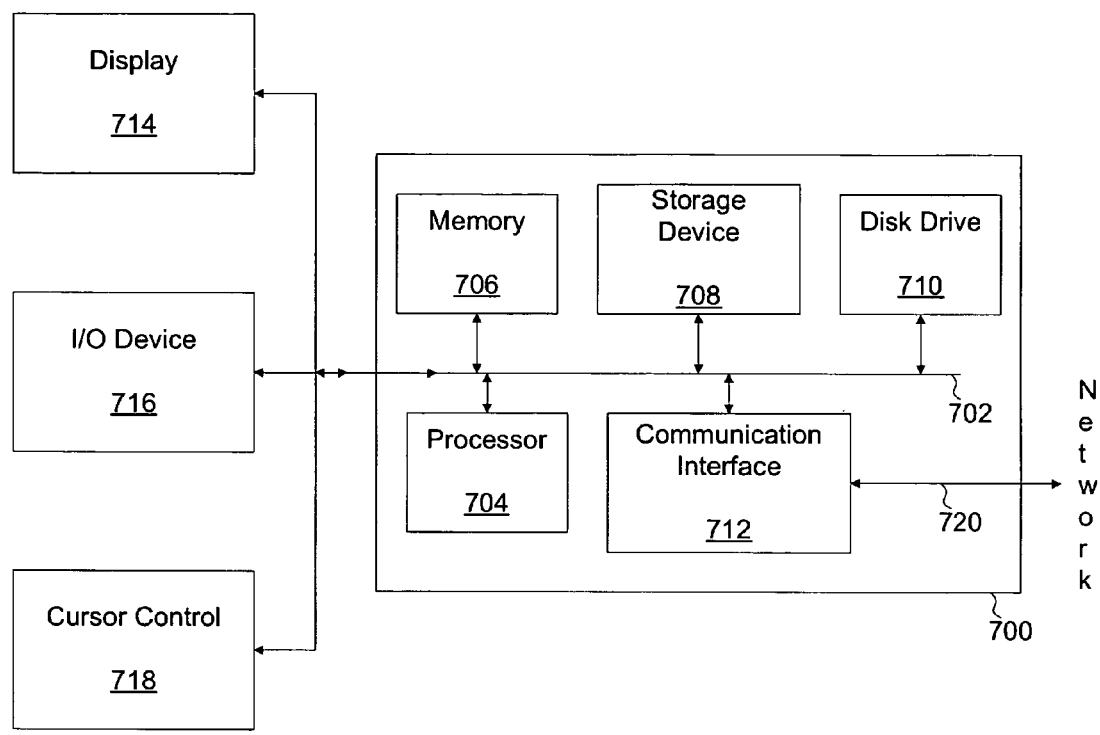
FIG. 7 is a block diagram illustrating an exemplary computer system suitable for web service generation.

FIG. 7 is a block diagram illustrating an exemplary computer system suitable for web service generation. In some examples, computer system 700 may be used to implement the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to one embodiment of the invention, computer system 700 performs specific operations by processor 704 executing one or more sequences of one or more instructions contained in system memory 706. Such instructions may be read into system memory 706 from another computer readable medium, such as static storage device 708 or disk drive 710. In alternative embodiments, hard-wired circuitry may be used in place of or in combination with software instructions to implement the invention.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 700. According to other embodiments of the invention, two or more computer systems 700 coupled by communication link 720 (e.g., LAN, PSTN, or wireless network) may perform the sequence of instructions to practice the invention in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A method for generating a web service, comprising:
   introspecting an original web service to determine an address, the original web service has an interface and provides first functionality;
   importing a WSDL (Web Services Description Language) definition associated with the original web service pointed by the address;
   selecting a template based on the WSDL definition; and
   building an extended web service using the WSDL definition and the template for extending the first functionality of the original web service by adding second functionality to the original web service, the extended web service includes a wrapper that wraps the original web service and layers functionality on the original web service without code modifications to the original web service, the extended web service is configured to receive a client call for the functionality, provide the second functionality, and pass the client call to the original web service to provide for the first functionality.

2. A method as recited in claim 1, wherein the address is a location.

3. A method as recited in claim 1, wherein the address is a namespace.

4. The method of claim 1, wherein the introspecting further includes receiving a namespace.

5. The method of claim 1, wherein the template is configured to modify functionality of the original web service.

6. The method of claim 1, wherein building the extended web service further includes modifying the extended web service after the extended web service is built.

7. The method of claim 1, further comprising modifying the original web service using the template.

8. The method of claim 1, wherein the extended web service provides the second functionality after passing the client call to the original web service.

9. A web service wrapping tool, comprising:
   an interpreter that introspects a first web service to retrieve a Web Services Description Language) definition pointed by an address, the WSDL definition associated with the first web service, the interpreter selects a template based on the WSDL definition, the first web service has a web service interface and provides first functionality;
   a generator that generates a class using the WSDL definition and the template, the template for adding second functionality to the first web service; and
   a builder that builds a second web service using the class generated by the generator, the second web service includes the first web service interface, the second web service includes a functionality superset that extends functionality of the first web service without modifying the code of the first web service, the second web service includes a wrapper layer for adding the functionality superset, the second web service is configured to receive a client call to the first web service for the first functionality, provide the second functionality, and pass the client call to the first web service to provide the first functionality.

10. The web service wrapping tool of claim 9, wherein the address is a namespace.

11. The web service wrapping tool of claim 9, wherein the second web service is a superset web service.

12. The wrapping tool of claim 9, wherein the definitions enable the wrapping tool to build the second web service.

13. The wrapping tool of claim 9, wherein the second web service includes metadata that allows the web service interface to be used and enables access to the functionality superset.

14. A system for generating a web service, comprising:
   a library of templates for extending the functionality to web services;
   an interpreter that receives an address and imports a set of WSDL (Web Services Description Language) definitions pointed by the address, the set of WSDL definitions are associated with an original web service, the interpreter selects a template from the library based on the set of WSDL definitions, the original web service has a first interface and provide a first functionality; and
   a generator that generates an extended web service using the set of WSDL definitions and the selected template, the extended web service has a wrapper that wraps the original web service and a functionality superset that extends the first functionality of the original web service, the wrapper allows the functionality superset to be layered onto the original web service without modifying code of the original web service;
   the system exposes to a client a second web interface to access the extended web service, the extended web services is configured to provide the functionality superset and pass a call from the client requesting the first functionality to the original web service.

15. The system of claim 14, wherein the extended web service includes metadata that allows the second web interface to be used and enables access to the functionality superset.

16. The system of claim 15, wherein the address is one of a namespace or a location.

17. A computer program product for evaluating content, the computer program product being embodied in a computer readable medium and comprising computer instructions for:

introspecting an original web service to determine an address;

importing a WSDL (Web Services Description Language) definition associated with the original web service pointed by the address, the original web service provides a first functionality;

selecting a template based on the WSDL definition, the template for extending the first functionality of the original web service by adding second functionality to the original web service; and building an extended web service using the WSDL definition and the template the extended web service has a wrapper that wraps the original web service and a functionality superset that extends the first functionality of the original web service, the extended web service includes a call to the original web service, the wrapper allows the functionality superset to be layered onto the original web service without modifying code of the original web service, the wrapper provides the functionality superset and passes a client call requesting the first functionality to the original web service.

* * * * *

UNITED STATES PATENT AND TRADEMARK OFFICE
CERTIFICATE OF CORRECTION

PATENT NO.        : 7,584,245 B2                                    Page 1 of 1
APPLICATION NO.   : 10/954936
DATED             : September 1, 2009
INVENTOR(S)       : Timothy Fulton Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Fourteenth Day of September, 2010

David J. Kappos
*Director of the United States Patent and Trademark Office*